United States Patent Office 3,176,546
Patented Apr. 6, 1965

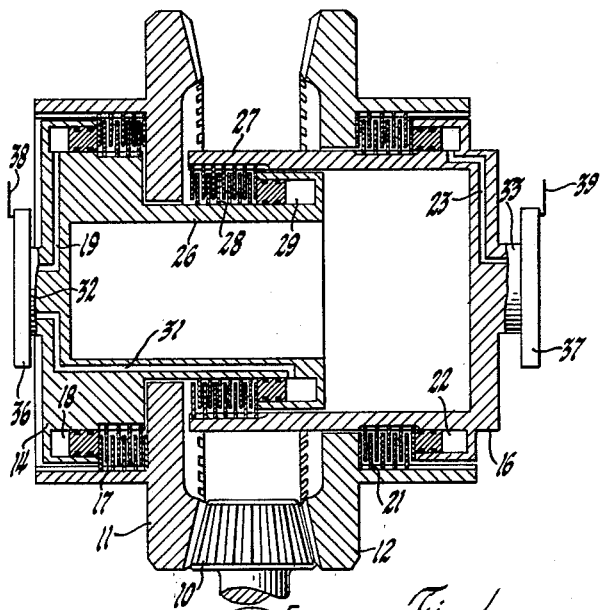

3,176,546
TRANSMISSION
Paul T. Johnson, Mentor, Ohio, assignor to General Motors Corporation, Detroit, Mich., a corporation of Delaware
Filed July 9, 1962, Ser. No. 208,236
12 Claims. (Cl. 74—665)

This invention relates to transmissions and more particularly to the combination of a forward and reverse drive transmission and a final drive transmission arranged to provide a straight forward and reverse drive and steering drives.

The drive train employs a transmission providing forward and reverse, preferably in a plurality of ratios, and a steering type differential. In the final drive of the differential type having a pair of driven shafts, the driving pinion drives a pair of ring gears, each of which may be connected to one driven shaft. The driven shafts may also be connected to each other to provide solid shaft or straight drive in either direction. Pivot turn may be provided by connecting each ring gear to its associated driven shaft to provide either right or left turns depending on whether the transmission is in forward or reverse. Either driven shaft may be selectively disengaged or floated and the vehicle brakes employed selectively to provide clutch brake steering.

An object of the invention is to provide a drive train including a transmission having forward or reverse drive and a final drive assembly of the differential type which may be connected to drive both driven shafts together in either a forward or a reverse direction, or to drive one driven shaft forwardly and the other driven shaft reversely, or to drive one driven shaft in either direction and disengage the drive to the other driven shaft and apply a brake to the other driven shaft.

An object of the invention is to provide a drive train including a transmission having forward or reverse drive and a final drive assembly of the differential type which may be connected to drive both driven shafts together in either a forward or a reverse direction, or to drive one driven shaft forwardly and the other driven shaft reversely, or to drive one driven shaft in either direction and float the other driven shaft.

An object of the invention is to provide a drive train including a transmission having forward or reverse drive and a final drive assembly of the differential type which may be connected to drive both driven shafts together in either a forward or a reverse direction, or to drive one driven shaft forwardly and the other driven shaft reversely.

Another object of the invention is to provide a final drive assembly having an input pinion driving a pair of gears, each of which may be selectively connected to one of a pair of driven shafts and a clutch for connecting the driven shafts.

Another object of the invention is to provide a final drive assembly having an input pinion driving a pair of ring gears which may be selectively connected to drive the driven shafts together or oppositely in either a forward or reverse direction.

These and other objects of the invention may be more fully apparent from the following description and drawings illustrating the preferred embodiments of the invention.

FIGURE 1 is a diagrammatic illustration of the transmission and one form of the final drive assembly.

FIGURE 2 is a diagrammatic illustration of the transmission and a modified final drive assembly.

FIGURE 3 is a diagrammatic illustration of the transmission and another modification of the final drive assembly.

The invention is illustrated in several transmission and final drive combinations driven by a right hand engine which rotates clockwise as viewed from the front of the vehicle having traction devices such as wheels or tracks. Hereinafter, reference is made to the right and left components of the final drive as being on the right and left side of a conventional vehicle with the engine in the front, the transmission in the center and the final drive at the rear. In FIGURE 1 the forward and reverse drive transmission 9, which has a control to provide a plurality of ratios in both forward and reverse drive, is connected to drive the input pinion 10 clockwise as viewed from the front of the vehicle, in forward as indicated by the arrow F, which meshes with a right ring gear 11 and a left ring gear 12 rotatably mounted respectively on the enlargement 14 of the right driven shaft 32 and the enlargement 16 of the left driven shaft 33 of the vehicle. The right ring gear 11 may be selectively connected to the right driven shaft 32 by the clutch 17 which has alternate plates splined to the ring gear 11 and intermediate plates splined to the shaft enlargement 14. The clutch 17 is actuated by fluid motor 18 mounted on driven shaft 14 and supplied with fluid via line 19 to actuate the motor 18 and engage the clutch 17 to connect the right ring gear with the right shaft 32. The left ring gear 12 is selectively connected to the left driven shaft 33 by clutch 21 having alternate plates splined to the ring gear 12 and the shaft enlargement 16. The clutch 21 is actuated by an annular fluid motor 22 on the supply of fluid to the motor via the line 23 to connect left ring gear 12 to left shaft 33. The driven shaft enlargements 14 and 16 have inwardly extending and overlapping sleeve shaft portions 26 and 27 which may be clutched together by the clutch 28 which has alternate plates splined to the sleeve shaft portions 26–27. The clutch 28 is actuated by the annular fluid motor 29 mounted on the inner sleeve 26 when fluid under pressure is supplied via line 31. The right or left shaft enlargements 14 and 16 transmit the drive respectively to the right and left driven shafts 32 and 33. Brakes 36 and 37 actuated by control 38 and 39 may be mounted respectively on the right and left driven shaft.

The modification shown in FIGURE 2 has an input pinion 51 driven by a transmission 9 in a clockwise direction (arrow F) in forward drive. The pinion 51 meshes with a right ring gear 52 and a left ring gear 53. The right ring gear 52 is fixed on the right driven shaft 54. The left ring gear 53 is rotatably mounted on the left driven shaft 56. The left driven shaft 56 has a hub portion 57 located within the ring gear 53 having an axial sleeve extension 58 extending toward the ring gear 52. The right driven shaft 54 has a sleeve extension 59 overlapped by the sleeve extension 58. A clutch 61 having alternate plates splined to the sleeve 58 and 59 is actuated by an annular fluid motor 62 when fluid is supplied via line 63. The ring gear 53 has a sleeve shaft extension 66 located externally of the sleeve unit extension 58. A clutch 67, having alternate plates splined to the sleeves 58 and 66, is actuated by an annular fluid motor 69 mounted on the hub 57 and operable on the supply of fluid via line 71 to engage the clutch 67.

A third modification of the final drive assembly, shown in FIGURE 3, is driven by the transmission 9 and has an input pinion 101 driving a right ring gear 102 and a left ring gear 103. The right ring gear 102 is rotatably mounted by bearings 104 on the hub 106 of the right driven shaft 107. The left ring gear 103 is rotatably mounted by bearings 108 on the hub 109 of the left driven shaft 111. The ring gear 102 has an internal cylindrical splined surface 112 and the hub 106 has a facing external cylindrical splined surface 113 between. The clutch 114 is located between these cylindrical splined surfaces with alternate plates splined to the internal splined surface 112 and intermediate plates splined to the external splined surface 113. The annular fluid motor 116, when supplied with fluid via line 117, engages the clutch 114 to connect right ring gear 102 to the hub 106 and right driven shaft 107. The left ring gear 103 has an internal cylindrical splined surface 121 facing external splined cylindrical surface 122 on the hub 109 between which the clutch 123 is located with alternate plates splined to the internal surface 121 and intermediate plates splined to the external surface 122. The annular fluid motor 124, when supplied with fluid via line 126, will engage the clutch 123 to connect the left ring gear 103 to the hub 109 and left driven shaft 111. In the central space between the hubs 106 and 109 and within the ring gears 102 and 103, the hub 109 has an internally splined sleeve extension 131 and the hub 106 has an externally splined sleeve extension 132. The clutch 133 is located between the sleeve extension and has alternate plates splined to the sleeve 131 and intermediate plate splined to sleeve 132. On the supply of fluid via line 134 to the fluid motor 136 the clutch 133 is engaged to clutch the right and left output shaft 107 and 111 together for rotation in unison. The right shaft hub 106 has attached thereto a brake hub 138 having an externally splined drum 139. The housing 140 has an internally splined drum potrion 141. The brake 142 has plates alternately splined to the drum 141 and 139. When fluid is supplied via the brake supply line 146 to the annular fluid motor 147, the brake plates are engaged against a fixed abutment 148 to apply the brake. A left brake hub 151 is attached to the left shaft hub 109 and has a cylindrical splined drum 152 having a fixed abutment 153. The housing has a splined drum portion 154. The left brake 156 consists of plates alternately splined to the housing drum 154 and the brake drum 152 and is engaged when fluid is supplied via line 157 to the annular fluid motor 158 to engage the plates against the abutment 153.

*Operation*

These final drive units, when used with a transmission providing forward and reverse drive, will provide solid shaft forward and reverse drive in either direction relative to the transmission output drive or input to the final drive, will provide pivot turns in either direction depending on the direction of the transmission drive. The transmission shown in FIGS. 1 and 3 also will float or freewheel either driven shaft and track with power in either direction applied to the other track to permit brake application to the floated driven shaft output.

The modification shown in FIGURE 1 will provide solid shaft forward and reverse drive pivot turn in either direction and permit floating or freewheeling one track while powering the other in either a forward or reverse direction. With an engine and transmission unit in forward ratio rotating clockwise as viewed from the front (arrow F) and located forward of the final drive unit in a vehicle, as illustrated in FIGURE 1, forward solid shaft drive is provided when the clutch 21 is engaged to connect the ring gear 12 to the left driven shaft 33, and the clutch 28 is engaged to connect the left driven shaft to drive the right driven shaft 32. With the transmission output operating in forward drive, the final drive unit may provide solid shaft reverse drive by disengaging clutch 21 and engaging clutch 17 so that a right ring gear 11 drives the right driven shaft 32 which in turn through clutch 28 drives the left driven shaft 33. When the transmission is operating in reverse drive it will be seen that both forward and reverse solid shaft drive may also be provided with reverse transmission output to the final drive assembly. The ring gear 11 is connected by clutch 17 to driven shaft 32 and shaft 32 by clutch 28 to the left driven shaft 33 for forward drive. For reverse drive, clutch 21 is engaged so that ring gear 12 drives driven shaft 33 and clutch 28 is engaged so that left driven shaft 33 drives right driven shaft 32.

In order to provide pivot turn, the clutch 28 is disengaged and remains disengaged. Both the clutches 21 and 17 are engaged so that each driven shaft rotates with its associated ring gear. With the transmission in forward drive, the left driven shaft 33 will be driven forwardly and the right driven shaft 32 reversely for a right pivot turn. A shift in the transmission to reverse drive will drive the right driven shaft 32 forwardly and the left driven shaft 33 reversely for left pivot steer. Also, in order that one of the tracks may be floated or freewheeled for brake steering, the clutch 28 is disengaged to permit relative rotation between the driven shafts. When the transmission is operating in forward drive, the left clutch 21 is engaged to drive the left driven shaft 33 for right steer. For sharper steering the right brake 36 may be engaged to retard the movement of the right driven shaft and track. Similarly, left steer may be obtained by placing the transmission in reverse drive and engaging clutch 17 to drive the right ring gear 11 and the right driven shaft 32 forwardly while the left driven shaft 33 is floating. For sharper left turning the brake 37 may be applied.

The modification shown in FIGURE 3 works in a similar manner to the unit shown in FIGURE 1 but has output brakes built into the differential or final drive housing as explained above and may be operated in accordance with the table set forth below in which "in" means engaged and "out" means disengaged with regard to the clutches. "On" in the brake columns means the brake may be engaged.

| Oper. | Left Track Movement | Right Track Movement | Transmission | Center Clutch 133 | Right Clutch 114 | Left Clutch 123 | Right Brake | Left Brake |
|---|---|---|---|---|---|---|---|---|
| 1 | | | Neutral | Out | Out | Out | | |
| 2 | Forward | Forward | Forward | In | Out | In | Off | Off |
| 3 | Reverse | Reverse | Reverse | In | Out | In | Off | Off |
| 4 | Reverse | Reverse | Forward | In | In | Out | Off | Off |
| 5 | Forward | Forward | Reverse | In | In | Out | Off | Off |
| 6 | Pivot Forward | Pivot Reverse | Forward | Out | In | In | Off | Off |
| 7 | Pivot Reverse | Pivot Forward | Reverse | Out | In | In | Off | Off |
| 8 | Forward | Float | Forward | Out | Out | In | Off | Off |
| 9 | Forward | Float—Brake | Forward | Out | Out | In | Off | On |
| 10 | Float | Forward | Reverse | Out | In | Out | Off | Off |
| 11 | Float—Brake | Forward | Reverse | Out | In | Out | On | Off |
| 12 | Reverse | Float | Reverse | Out | Out | In | Off | Off |
| 13 | Reverse | Float—Brake | Reverse | Out | Out | In | Off | On |
| 14 | Float | Reverse | Forward | Out | In | Out | Off | Off |
| 15 | Float—Brake | Reverse | Forward | Out | In | Out | On | Off |
| 16 | Brake | Brake | | | | | On | On |

The final drive mechanism shown in FIGURE 2 when used in connection with a transmission 9 providing forward and reverse drive will provide solid shaft drive in both forward and reverse and pivot turn in either direction. For solid shaft drive the clutch 61 is engaged and the clutch 67 is disengaged. Forward or reverse drive is provided as the transmission drives in forward or reverse. For pivot steer the clutch pack 61 is released and the clutch 67 is engaged so that each of the ring gears 52 and 53 is connected respectively to the right and left output shafts 54 and 56. Then when the transmission is driving in a forward direction, the right driven shaft will be driven forwardly and the left driven shaft 56 will be driven reversely to provide left pivot steer. When the transmission is driving in reverse, the left ring gear and driven shaft 56 will be driven forwardly while the right ring gear 52 and driven shaft 54 will be driven in reverse to provide right pivot steer.

The direction of rotation of the input pinion of the final drive or differential units, if reversed, merely reverses the direction of the drive and steering.

It will be appreciated that modifications of the invention may be made within the scope of the appended claims.

I claim:

1. In a drive mechanism, a transmission having an output member and providing forward and reverse direction drive of said output member, a pair of driven shafts, a final drive selectively connecting said output member and said driven shafts, operative in one condition to connect the output member to drive one driven shaft in one direction and the other driven shaft in the other direction and means to control said transmission to provide drive in one drive direction to drive said final drive to provide a steering drive in one steering direction and to provide drive in the other drive direction to drive said final drive to provide a steering drive in the other steer direction.

2. In a drive mechanism, a transmission having an output member and providing forward and reverse direction drive of said output member, a pair of driven shafts, a final drive means selectively connecting said output member and said driven shafts, operative in one condition to connect the output member to drive one driven shaft in one direction and the other driven shaft in the other direction under a first condition of operation and to drive both driven shafts in the same direction under a second condition of operation and means to control said transmission to provide drive in one drive direction to drive said final drive to provide a steering drive in one steer direction and to provide drive in the other drive direction to drive said final drive to provide a steering drive in the other steer direction under said first condition of operation and to control said transmission to provide straight forward or reverse drive under said second condition of operation.

3. In a drive mechanism, a transmission having an output member and providing forward and reverse direction drive of said output member, a pair of driven shafts, a final drive means selectively connecting said output member and said driven shafts, operative in one condition to connect the output member to drive one driven shaft in one direction and the other driven shaft in the other direction under a first condition of operation and to drive both driven shafts in the same direction under a second condition of operation and to selectively drive one or the other driven shafts under a third condition of operation, and means to control said transmission and final drive to provide drive in one drive direction to drive said final drive to provide a steering drive in one steer direction and to provide drive in the other drive direction to drive said final drive to provide a steering drive in the other steer direction under said first condition of operation and to control said transmission to provide straight forward or reverse drive under said second condition of operation and to control said transmission to provide steering drive in either forward or reverse.

4. In a drive mechanism, a final drive assembly having an input member, a pair of driven members driven in opposite directions by said input member, a pair of driven shafts, clutch means connecting one driven member to one driven shaft, second clutch means connecting the other driven member to the other driven shaft, and third clutch means connecting one driven shaft to the other driven shaft.

5. In a drive mechanism, a transmission having an output member and providing forward drive and reverse drive of the output member, a final drive assembly having an input member driven by said transmission output member, a pair of driven members driven in opposite directions by said input member, a pair of driven shafts, clutch means connecting one driven member to one driven shaft, second clutch means connecting the other driven member to the other driven shaft, third clutch means connecting one driven shaft to the other driven shaft, and brake means connected to retard each of said driven shafts.

6. In a drive mechanism, a transmission having an output member and providing forward drive and reverse drive of the output member, a final drive assembly having an input member driven by said transmission output member, a pair of driven members driven in opposite direction by said input member, a pair of driven shafts, clutch means connecting one driven member to one driven shaft, second clutch means connecting the other driven member to the other driven shaft, and third clutch means connecting one driven shaft to the other driven shaft.

7. In a drive mechanism, a transmission having an output member and providing forward drive and reverse drive of the output member, a final drive assembly having an input member driven by said transmission output member, a pair of driven members driven in opposite directions by said input member, a pair of driven shafts, first clutch means connecting one driven member to one driven shaft, second clutch means connecting the other driven member to the other driven shaft, third clutch means connecting one driven shaft to the other driven shaft, means to apply said first and third clutches for straight forward drive, and means to apply said second and third clutches for straight reverse drive, means to apply said first and second clutch and place said transmission in forward or reverse drive to provide right or left pivot steer.

8. In a drive mechanism, a transmission having an output member and providing forward drive and reverse drive of the output member, a final drive assembly having an input member driven by said transmission output member, a pair of driven members driven in opposite directions by said input member, a pair of driven shafts, first clutch means connecting one driven member to one driven shaft, second clutch means connecting the other driven member to the other driven shaft, third clutch means connecting one driven shaft to the other driven shaft, brake means connected to retard each of said driven shafts, means to apply said first and third clutches for straight forward drive, means to apply said second and third clutches for straight reverse drive, means to apply said first and second clutch and place said transmission in forward or reverse drive to provide right or left pivot steer, means to apply said first clutch and the brake to retard the other driven shaft and to apply said second clutch and the brake to retard the one driven shaft to provide steering.

9. In a drive mechanism, a final drive assembly having an input pinion, a pair of ring gears meshing with said pinion on opposite sides of said pinion, a pair of driven shafts, clutch means connecting one ring gear to one driven shaft, second clutch means connecting the other ring gear to the other driven shaft, and third clutch means connecting one driven shaft to the other driven shaft.

10. In a drive mechanism, a final drive assembly having an input pinion, a pair of ring gears meshing with said pinion on opposite sides of said pinion, a pair of driven shafts, clutch means connecting one ring gear to one driven shaft, second clutch means connecting the other ring gear to the other driven shaft, third clutch means connecting one driven shaft to the other driven shaft, and brake means connected to retard each of said driven shafts.

11. In a drive mechanism, a transmission having an output member and providing forward drive and reverse drive of said output member, a final drive assembly having an input pinion driven by said transmission output member, a pair of ring gears meshing with said pinion on opposite sides of said pinion, a pair of driven shafts, clutch means connecting one ring gear to one driven shaft, second clutch means connecting the other ring gear to the other driven shaft, third clutch means connecting one driven shaft to the other driven shaft.

12. In a drive mechanism, a transmission having an output member and providing forward drive and reverse drive of said output member, a final drive assembly having an input pinion driven by said transmission output member, a pair of ring gears meshing with said pinion on opposite sides of said pinion, a pair of driven shafts, clutch means connecting one ring gear to one driven shaft, second clutch means connecting the other ring gear to the other driven shaft, third clutch means connecting one driven shaft to the other driven shaft, and brake means connected to retard each of said driven shafts.

References Cited by the Examiner

UNITED STATES PATENTS

| | | | |
|---|---|---|---|
| 2,521,658 | 9/50 | Van Voorhis | 74—710.5 |
| 2,599,058 | 6/52 | Johansen et al. | |
| 3,056,310 | 10/62 | Ruff | 74—378 |

DON A. WAITE, *Primary Examiner.*